United States Patent [19]
Schottler

[11] Patent Number: 5,969,520
[45] Date of Patent: Oct. 19, 1999

[54] MAGNETIC BALL JOYSTICK

[75] Inventor: Joseph J. Schottler, Crystal, Minn.

[73] Assignee: Sauer Inc., Ames, Iowa

[21] Appl. No.: 08/951,766

[22] Filed: Oct. 16, 1997

[51] Int. Cl.[6] ............................. G05G 9/053; G01B 7/30
[52] U.S. Cl. ............................. 324/207.2; 74/471 XY; 200/6 A; 324/207.22
[58] Field of Search ............................. 324/207.2, 207.21, 324/207.22, 207.25; 200/6 A; 74/471 XY; 338/128; 341/20; 345/161

[56] References Cited

U.S. PATENT DOCUMENTS

| | | | |
|---|---|---|---|
| 3,331,971 | 7/1967 | Moller | 324/207.2 X |
| 3,331,972 | 7/1967 | Möller | 338/128 X |
| 4,459,578 | 7/1984 | Sava et al. | |
| 4,500,867 | 2/1985 | Ishitobi et al. | 338/128 |
| 4,584,577 | 4/1986 | Tample. | |
| 4,661,773 | 4/1987 | Kawakita et al. | 324/207.22 |
| 4,825,157 | 4/1989 | Mikan | 324/207.2 |
| 5,160,918 | 11/1992 | Saposnik et al. | |
| 5,286,024 | 2/1994 | Winblad | 338/128 X |
| 5,300,883 | 4/1994 | Richeson | 324/207.25 X |
| 5,831,554 | 11/1998 | Hedayat et al. | 324/207.2 X |

*Primary Examiner*—Gerard Strecker
*Attorney, Agent, or Firm*—Zarley, McKee, Thomte, Voorhees & Sease

[57] ABSTRACT

A joystick mechanism includes a housing, a substantially spherical magnetic ball rotatably mounted on the housing, a joystick shaft attached to the magnetic ball, and a pair of magnetic effect sensors operatively positioned adjacent the magnetic ball. The sensors, which are positioned along the x and y axes, are aimed perpendicular to each other and the z axis. Thereby, movement of the joystick and the ball causes a change in the magnetic field which is measured and indicated by the sensors.

6 Claims, 1 Drawing Sheet

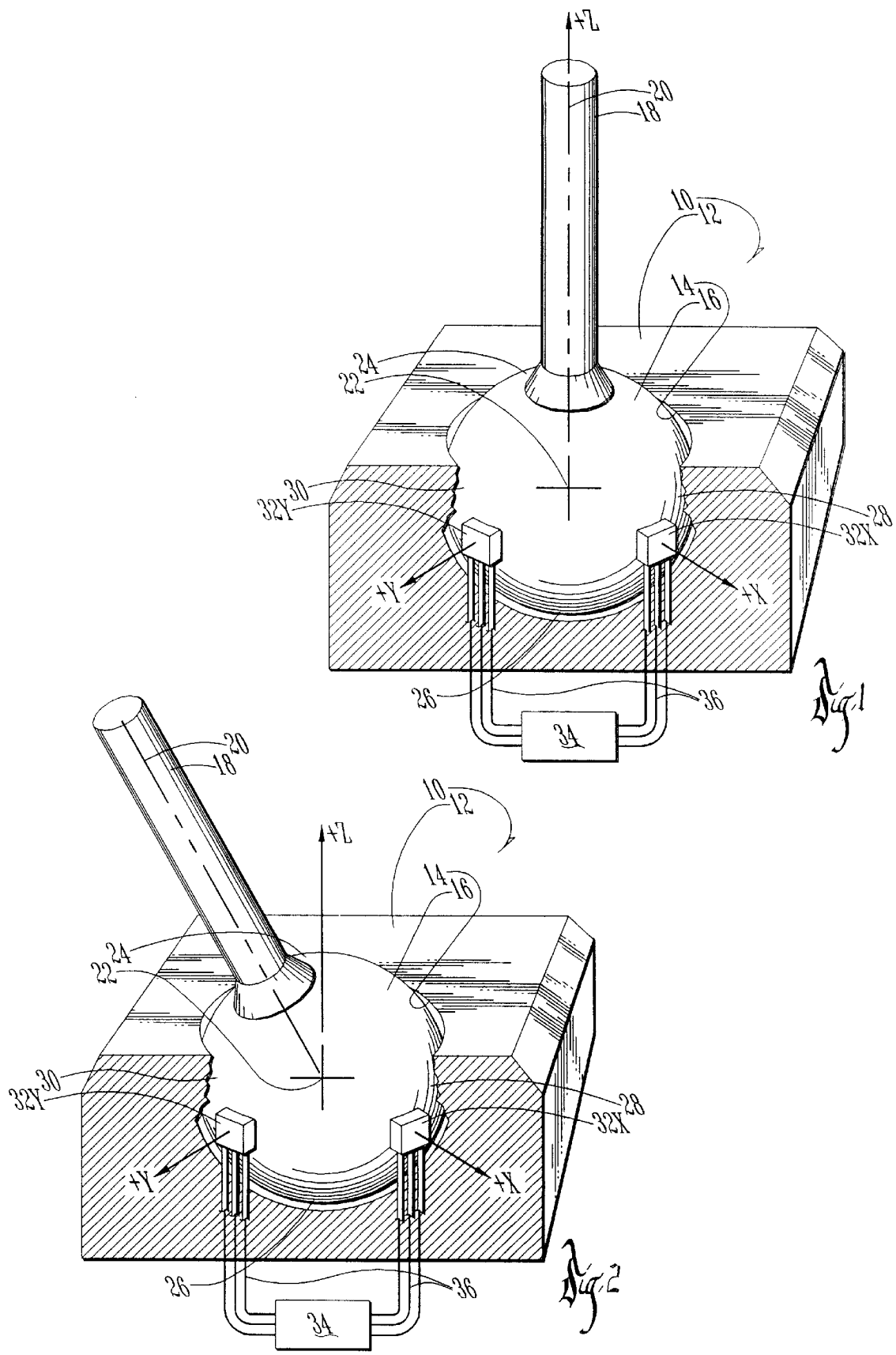

5,969,520

MAGNETIC BALL JOYSTICK

BACKGROUND OF THE INVENTION

The present invention relates to the field of joysticks used for control purposes. More particularly, this invention provides a joystick mechanism having a substantially spherical magnetic ball.

Joystick controls have been known and available in the field of control devices for some time. Joysticks are used on various equipment, including aerial lifting devices having pivotal booms. Conventional joystick controls typically utilize a plurality of temporary or permanent magnets. However, these conventional joystick mechanisms have typically been complex, costly, difficult to manufacture, less than reliable, or some combination of these undesirable characteristics.

Therefore, a primary objective of the present invention is the provision of an improved joystick mechanism.

A further objective of this invention is the provision of a joystick mechanism which has relatively few parts.

A further objective of this invention is the provision of a joystick mechanism which has a simple sensing mechanism for measuring rotation of the joystick with respect to two perpendicular planes.

A further objective of this invention is the provision of a joystick mechanism which is more reliable than conventional joystick mechanisms.

A further objective of this invention is the provision of a joystick mechanism which is simple, economical to produce, and durable in use.

These and other objectives will be apparent from the drawings, description and claims which follow.

SUMMARY OF THE INVENTION

A joystick mechanism includes a housing, a substantially spherical magnetic ball rotatably mounted on the housing, a joystick shaft attached to the magnetic ball, and a pair of magnetic effect sensors operatively positioned adjacent the magnetic ball. The magnetic ball has a magnetic field which is aligned with the z axis. With the ball and joystick in a neutral position, the longitudinal axis of the joystick shaft coincides with the z axis. The sensors, which are positioned along x and y axes, are aimed perpendicular to each other and the z axis. The movement of the joystick and the ball attached thereto alters the sensed magnetic field. The sensors can output an electrical signal indicative of the displacement and/or new position of the joystick and ball.

The unique spherical shape of the permanent magnetic ball, the perpendicularly directed sensors, and the cavity in which the ball is housed yield a simple yet accurate arrangement to measure displacement of the joystick. Joystick displacement is easily converted into electrical signals which can be utilized in a microcontroller or other electronic device for operator control purposes.

BRIEF DESCRIPTION OF THE DRAWINGS

FIG. 1 is a perspective view of the joystick mechanism of the present invention in a neutral position with the front portion of the housing broken away to expose the sensors.

FIG. 2 is a perspective view of the joystick mechanism of FIG. 1 with the joystick displaced from the neutral position. The front portion of the housing is broken away to expose the sensor.

DETAILED DESCRIPTION OF THE PREFERRED EMBODIMENT

In the figures, as well as in the description below, the reference numeral 10 denotes the joystick mechanism of this invention.

Referring to FIG. 1, the joystick mechanism 10 includes a housing 12 with a cradle member comprising a cavity 14 therein which is at least partially spheroidal. The cavity 14 is adapted to receive and journal a rotatable spherical magnetic ball 16. Thus, the housing 12 acts as a bearing surface or a carrier for the ball 16. The housing 12 can be made of plastic, brass or other suitable non-magnetic material to provide a bearing surface for gyration of the ball 16 in the cavity 14.

The ball 16 has a center of rotation 22 and a lower portion which slidably bears on the surface of the cavity 14. The ball 16 also includes an upper or exposed portion which does not normally bear on the housing 12 at the surface of the cavity 14 in the position shown in FIG. 1.

An elongated joystick shaft 18 attaches to the ball 16 and extends vertically upward therefrom in FIG. 1. The joystick shaft 18 has a central longitudinal axis 20. It is contemplated that the joystick shaft 18 can be integrally formed with the ball 16 or otherwise suitably attached thereto.

The position of the joystick mechanism 10 shown in FIG. 1 is referred to as the neutral position. The joystick shaft 18 extends vertically upward so that the longitudinal axis 20 coincides with the z axis of a standard three dimensional fixed reference system. Of course, the x axis and the y axis are perpendicular to each other and to the z axis. The central longitudinal axis 20 projects through the center 22 of the ball 16. The housing 12 remains fixed with respect to the x, y and z references, while the ball 16 can be rotated within the cavity 14 by the joystick shaft 18. Thus, the joystick shaft 18 and the ball 16 attached thereto can be rotated to a different position with respect to the fixed reference system (see FIG. 2). It is contemplated that the housing 12 could rotate relative to a fixed ball 16, instead of vice versa.

The ball 16 is a permanent magnet. Preferably, the magnetic ball 16 includes the material Alnico, which is an alloy of cobalt, nickel and aluminum used to make small permanent magnets. The ball 16 is magnetized such that the lines of magnetic force extend in the Z direction (parallel with the longitudinal axis 20 if the joystick shaft 18). If we consider the magnetic ball to be like a globe, the ball has a north end 24, a south end 26, an east end 28 and a west end 30 in FIG. 1.

Two bi-directional linear magnetic sensors 32X, 32Y mount on the housing 12, at or near the cavity 14. Preferably, sensors 32X, 32Y are of the Hall Effect type. As known in the art, the sensors 32X, 32Y must be juxtapositioned very close to the outer peripheral surface of the spherical magnetic ball 16 to operate properly. The magnetic sensor 32X mounts on the x axis and measures the magnetic field parallel to the x axis. The sensor 32Y mounts on the y axis and measures the magnetic field parallel to the y axis. The magnetic sensors 32X, 32Y are connected to a microcontroller 34 by appropriate electrical connections or wire sets 36. The microcontroller 34 processes signals from the sensors 32X, 32Y and processes them to control a work function. For example, microprocessor 34 can control various electrical and hydraulic devices to position the platform of an aerial lifting device. It is contemplated that other electronic devices adapted to receive operator input through the joystick mechanism could be substituted or used in addition to the microcontroller 34 without detracting from the invention. The magnetic sensors 32X, 32Y measure the rotation or displacement of the ball 16 about the y and x axes respectively and convert these measurements into electrical signals.

FIGS. 1 and 2 illustrate the use of the invention. In the neutral position shown in FIG. 1, the joystick shaft 18 extends vertically along the positive z axis. In this position, the two sensors 32X, 32Y experience no lines of magnetic flux penetrating them. Therefore, the sensors 32X, 32Y both output a signal indicating zero magnetic field.

Referring to FIG. 2, when the joystick shaft 18 is moved toward the positive y axis, the spherical magnetic ball 16 rotates around the x axis. As a result, the sensor 32Y on the y axis will be exposed to a magnetic field of greater magnitude as the north end 24 of the magnet approaches the sensor 32Y. The more the ball 16 rotates toward the y axis under the command of the joystick shaft 18, the more the magnetic field of the ball 16 will be aligned with the y axis. The magnetic field will increase near the y axis. The sensor 32Y will detect this condition and send an electrical signal to the microcontroller indicative of the strength of the magnetic field. Thus, the magnitude or amplitude of the signal generated by the magnetic sensor 32Y depends on how close the joystick shaft 18 is moved into alignment with the y axis. When the joystick shaft 18 rotates the ball 16 in the negative y direction, the sensor 32Y sees a magnetic field of increasing magnitude but different sign as the south end 26 of the ball 16 approaches the sensor 32Y.

The magnetic sensor 32X works in a similar manner and sends a signal of increasing magnitude in response to the magnetic field when the joystick shaft 18 and ball 16 are moved toward the x axis. Since the spherical magnetic ball 16 is in a fixed position along the z axis, the sensors 32X, 32Y are able to generate signals indicating displacement and pinpointing the exact spatial location of the ball 16. The sensors signal the x and y coordinates while the Z coordinate is known. The sensors 32X, 32Y send their signals to the microcontroller 34.

Thus, the signal from the sensor 32X on the x axis indicates displacement of the joystick shaft 18 and the ball 16 in the x direction (rotation about the y axis). The signal from the sensor 32Y on the y axis indicates displacement of the joystick shaft 18 and the ball 16 is the y direction (rotation about the x axis). Preferably the sensors 32X, 32Y send Hall Effect voltage signals to the microcontroller 34.

The signals regarding displacement can also be utilized over finite time intervals to provide information regarding the direction and acceleration of the joystick.

It is contemplated that the sensors would be located higher or lower than the equator of the ball and radially spaced by angles other than ninety degrees. The center of the ball could also be offset from the origin.

The permanent spherical magnet and magnetic field sensors disposed therearound in this invention make it possible to simply, accurately, and reliably measure joystick displacement.

Thus, it can be seen that the present invention at least achieves its stated objectives.

What is claimed is:

1. A joystick mechanism, comprising, a solid housing having a cavity therein in the shape of a partial sphere, the cavity being fully enclosed except for a top opening which has an area less than the largest cross-sectional area of the cavity, a single one-piece spherical ball rotatably mounted in the cavity and having only a top portion protruding from the cavity through the top opening in the housing, the ball being comprised of a magnetic material and having a neutral z axis extending from its center upwardly through the center of the top opening, the ball being magnetized so that the lines of magnetic force extend parallel to the z axis, a joystick shaft attached to the ball and extending therefrom in a direction through the top opening of the cavity and having a centerline coextensive with the z axis to rotate the ball about its center, the cavity providing the full support for the ball, the ball having a center for rotation defining the origin of an x-y-z reference system fixed with respect to the housing comprised of x and y axes intersecting the z axis, only two linear magnetic effect sensors mounted on the housing in the cavity adjacent the ball and being located on the x and y axes respectively, the sensors being bi-directional magnetic sensors, and being capable of detecting changes in the magnitude of the magnetic field when the ball is rotated to generate signals indicative of displacement of the ball in the x-y plane.

2. The mechanism of claim 1 wherein the sensors are Hall Effect sensors.

3. The mechanism of claim 1 wherein the magnetic ball is made of Alnico.

4. The mechanism of claim 1 wherein the magnetic ball has a permanent magnetic field.

5. The joystick mechanism of claim 1 wherein the joystick shaft attached to the ball extends therefrom in only a single direction through the top opening.

6. The joystick mechanism of claim 1 wherein a microcontroller is connected to the sensors for receiving and processing the signals to control a work function based upon displacement of the ball.

* * * * *